United States Patent
Sumi et al.

(10) Patent No.: US 6,920,087 B2
(45) Date of Patent: Jul. 19, 2005

(54) MAGNETO-OPTICAL RECORDING APPARATUS CAPABLE OF ADJUSTING THE MAGNETIC HEAD

(75) Inventors: Satoshi Sumi, Gifu (JP); Yoshihisa Suzuki, Ichinomiya (JP); Sayoko Okada, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 91 days.

(21) Appl. No.: 10/395,701

(22) Filed: Mar. 25, 2003

(65) Prior Publication Data

US 2003/0227832 A1 Dec. 11, 2003

(30) Foreign Application Priority Data

Mar. 25, 2002 (JP) ........................................ 2002-084175

(51) Int. Cl.⁷ ............................................. G11B 11/00
(52) U.S. Cl. ................................... 369/13.12; 369/13.2
(58) Field of Search ......................... 369/13.12, 13.11, 369/13.2, 13.14, 13.15, 13.21, 13.24

(56) References Cited

U.S. PATENT DOCUMENTS

| | | | | |
|---|---|---|---|---|
| 5,193,080 A | * | 3/1993 | Mohri et al. ............. | 369/13.12 |
| 6,044,043 A | * | 3/2000 | Aoki et al. ................ | 369/13.2 |
| 6,185,162 B1 | * | 2/2001 | Kunimatsu et al. ....... | 369/13.12 |
| 6,314,062 B1 | * | 11/2001 | Suzuki et al. ............ | 369/13.17 |
| 6,404,705 B1 | * | 6/2002 | Watanabe et al. ......... | 369/13.14 |
| 6,466,523 B1 | * | 10/2002 | Ishii ......................... | 369/13.12 |

* cited by examiner

*Primary Examiner*—Tan Dinh
(74) *Attorney, Agent, or Firm*—McDermott Will & Emery LLP

(57) ABSTRACT

A magneto-optical disk apparatus generates magnetic field onto a magneto-optical recording medium prior to recording signals in the magneto-optical recording medium having a recording layer and a reproduction layer, by use of magnetic field and laser beam. The magneto-optical apparatus then adjusts a position of a magnetic head that generates the magnetic field, under a state where the laser beam is irradiated, by utilizing that an irradiation spot of the laser beam deviates due to eccentricity of the magneto-optical recording medium. This position adjustment is carried out based on, for example, a beam position signal showing the irradiation spot of the laser beam and/or a detection signal which is detected after the laser beam is modulated by the magnetic field.

13 Claims, 13 Drawing Sheets

(a)

(b)

MAGNETO-OPTICAL RECORDING APPARATUS CAPABLE OF ADJUSTING THE MAGNETIC HEAD

BACKGROUND OF THE INVENTION

1. Field of the Invention

The present invention relates to a magneto-optical disk apparatus that records signals on a magneto-optical recording medium, and it particularly relates to the magneto-optical disk apparatus that adjusts the position of a magnetic head prior to recording the signals.

2. Description of the Related Art

Computers and mobile terminals prevail widely in today's highly information-oriented society, and the research and development of a variety of digital recording media that can efficiently record the ever-increasing electronic information is being conducted daily. Also, as the recording format of electronic equipment, such as cameras and video equipment, changes from analog to digital, much attention is now focused on digital recording media. Of such media, magneto-optical recording media in particular, with their large storage capacity and rewritable property, are amid an intense development competition reflecting the great expectations of the market.

In recent years, the recording density of magneto-optical recording media has been rising by rapid strides. However, even higher density is greatly in demand, and it is necessary to further develop signal recording and reproduction technologies to satisfy such demands.

In order to record a signal on a magneto-optical recording medium, a laser beam and a magnetic field are applied to a specific domain of the magneto-optical recording medium. To accomplish this, it is necessary to accurately position the magnetic head that generates the magnetic field. The accuracy of this positioning is crucial if higher density of recording is to be realized. Normally, eccentricity is caused in the magneto-optical recording media and it is nearly impossible to zero this eccentricity in the manufacturing process. Due to this eccentricity, therefore, an inaccurate positioning of the magnetic head causes a deviation of the center of the magnetic field from the optical axis of light beam. And this deviation is fatal especially to the recording at high densities.

SUMMARY OF THE INVENTION

The present invention has been made in view of the foregoing circumstances and an object of the present invention is to provide a magneto-optical disk apparatus capable of solving the above problem.

According to a preferred embodiment of the present invention, there is provided, in order to solve the above-described problems and achieve the objects, a magneto-optical disk apparatus that records signals, utilizing a laser beam and a magnetic field, in a magneto-optical recording medium having a recording layer and a reproduction layer, the apparatus which generates the magnetic field onto the magneto-optical recording medium prior to recoding the signals and which adjusts a position of a magnetic head that generates the magnetic field, under a state where the laser beam is irradiated, by utilizing that an irradiation position of the laser beam deviates due to eccentricity of the magneto-optical recording medium. According to the magneto-optical disk apparatus of this embodiment, the position adjustment of the magnetic head can be realized utilizing the eccentricity of the magneto-optical recording medium.

It is preferable that the magnetic field generated to adjust the position of the magnetic head is weaker than a recording magnetic field generated at the time of recording, and the intensity of the laser beam irradiated to adjust the position of the magnetic head is less than that generated at the time of recording.

According to another preferred embodiment of the present invention, there is provided a magneto-optical disk apparatus that records signals in a magneto-optical recording medium having a recording layer and a reproduction layer, the apparatus which comprises: a magnetic head which generates a magnetic field onto the magneto-optical recording medium; an optical head which irradiates a laser beam to the magneto-optical recording medium and detects reflected light therefrom; a supply unit which supplies a beam position signal that indicates an irradiation position of the laser beam in the magneto-optical recording medium; and an adjustment unit which adjusts a position of the magnetic head, utilizing a detection signal generated based on the reflected light and the beam position signal. According to the magneto-optical disk apparatus of this embodiment, the position of the magnetic head can be adjusted by a relationship between the beam position signal and the detection signal.

The adjustment unit may determine a center position of the magnetic head, based on an error signal obtained by multiplying the beam position signal by the detection signal. Moreover, the adjustment unit may determine a center position of said magnetic head, based on a result in which the detection signal is sampled at timings when the beam position signal indicates a peak value and a bottom value. If sampled amplitude values are substantially equal, then the adjustment unit may determine and regard the then corresponding position of the magnetic head as the center position.

According to still another preferred embodiment of the present invention, there is provided a magneto-optical disk apparatus that records signals in a magneto-optical medium having a recording layer and reproduction layer, the apparatus which comprises: a magnetic head which generates a detection magnetic field which is lower than a recording magnetic field; an optical head which irradiates a laser beam to the magneto-optical recording medium and detects reflected light therefrom; and an adjustment unit which adjusts a position of the magnetic head, utilizing a detection signal generated based on the reflected light. According to the magneto-optical disk apparatus of this embodiment, the position of the magnetic head can be accurately adjusted.

The optical head may irradiate the laser beam to a mark area, having a plurality of clock lengths, which are recorded in the magneto-optical recording medium, and adjustment unit may determine a center position of the magnetic head by making use of the detection signal generated based on the light reflected from the mark area. The adjustment unit may determine the center position of the magnetic head by making use of an integration result of the detection signal in the mark area. The adjustment unit may determine the center position of the magnetic head, based on an amplitude area of the detection signal corresponding to a substantially central portion of the mark area. The mark area may be recorded in a reserve region inside an address region.

According to still another preferred embodiment of the present invention, there is provided a magneto-optical disk apparatus that records signals in a magneto-optical recording medium having a recording layer and a reproduction layer, the apparatus which comprises: a magnetic head which generates a magnetic field onto the magneto-optical recording medium; an optical head which irradiates a laser beam to the magneto-optical recording medium and detects reflected light therefrom; and an adjustment unit which adjusts a position of the magnetic head, utilizing an amplitude of a detection signal generated based on the reflected light. According to the magneto-optical disk apparatus of this embodiment, the position of the magnetic head can be accurately adjusted.

The adjustment unit may determine a center position of the magnetic head, based on a relationship between strength of magnetic field applied and amplitude of the detection signal in the magneto-optical recording medium. The magnetic head may change the strength of the magnetic field generated and the adjustment unit may determine a center position of the magnetic head, based on amplitudes of the detection signal in magnetic fields of different strengths.

According to still another preferred embodiment of the present invention, there is provided a magneto-optical disk apparatus that records signals, utilizing a laser beam and a magnetic field, in a magneto-optical medium having at least a recording layer and a reproduction layer, the apparatus which adjusts a position of a magnetic head that generates the magnetic field, prior to recording the signals, by utilizing that an irradiation position of the laser beam deviates due to eccentricity of the magneto-optical medium under a state where there is a leakage of magnetic field from an optical head and the laser beam is irradiated. According to the magneto-optical disk apparatus of this embodiment, the position of the magnetic head can be adjusted, without the magnetic field being applied from the magnetic head, namely, by utilizing the magnetic field leaked from a magnet built in the optical head. The coercive force of the reproduction layer is preferably less than strength of the magnetic field leaked from the optical head.

It is to be noted that any arbitrary combination of the above-described structural components, and expressions changed between a method, an apparatus, a system, a recording medium and so forth are all effective as and encompassed by the present embodiments.

Moreover, this summary of the invention does not necessarily describe all necessary features so that the invention may also be sub-combination of these described features.

DETAILED DESCRIPTION OF THE INVENTION

The invention will now be described based on preferred embodiments which do not intend to limit the scope of the present invention but exemplify the invention. All of the features and the combinations thereof described in the embodiments are not necessarily essential to the invention.

Figure 1:
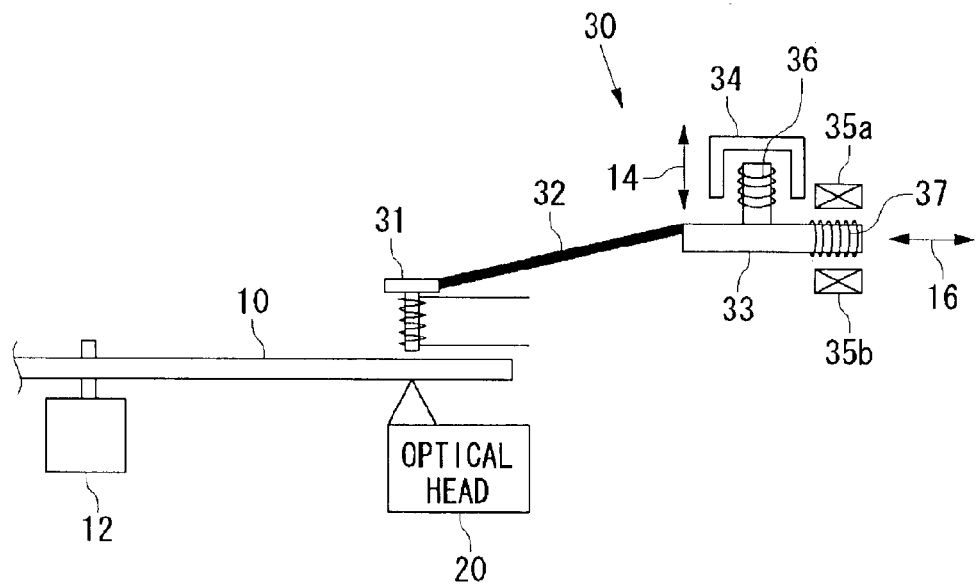
FIG. 1 shows a positional relationship between a magneto-optical recording medium, an optical head and a magnetic head in a magneto-optical disk apparatus.

FIG. 1 shows a positional relationship between a magneto-optical recording medium 10, an optical head 20 and a magnetic head 30 of a magneto-optical disk apparatus. The magneto-optical recording medium 10 is rotated at a predetermined rotational speed by a spindle motor 12. The magnetic head 30 is disposed on one side of the magneto-optical recording medium 10, and the optical head 20 is disposed, on the other side thereof, counter to the magnetic head 30 with the magneto-optical recording medium 10 in between.

The magnetic head 30 is comprised of a magnetic element 31, an arm 32, a substrate 33, a magnet 34, a coil 36 wound around a core, magnets 35a and 35b, and a coil 37 wound around the substrate 33. The magnet 34 is so formed as to surround the coil 36 and can apply a force on the coil 36 when a current is flowed to the coil 36. As the current flows, the substrate 33 moves in the direction of an arrow 14 and the travel thereof is conveyed to the magnetic element 31 via the arm 32, thus moving the magnetic element 31 in the direction of the arrow 14. The magnetic head 30 is a floating type head having a floating distance depending on the rotational speed of the magneto-optical recording medium 10. By controlling the amount and direction of the current flowing in the coil 36, the distance between the magnetic head 30 and the magneto-optical recording medium 10 is maintained constant.

Moreover, the magnets 35a and 35b are disposed around the coil 37 and can apply a force on the coil 37 when a current is flowed to the coil 37. Thereby, the substrate 33 moves in the direction of an arrow 16 and the travel thereof is conveyed to the magnetic element 31 via the arm 32, thus moving the magnetic element 31 in the direction of the arrow 16, namely, in the radial direction of the magneto-optical recording medium 10.

Figure 2:
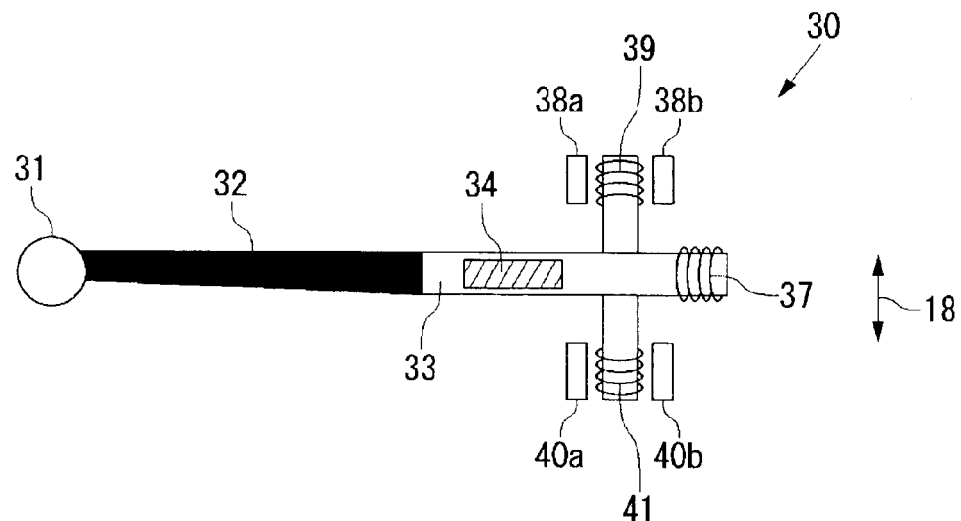
FIG. 2 is a plan view of a magnetic head.

FIG. 2 is a plan view of a magnetic head 30. The substrate 33 has a cross-shaped flat structure, of which the member with the coil 37 formed thereon intersects at right angles with the other member with a coil 39 and a coil 41 formed thereon. Moreover, magnets 38a and 38b are provided on their respective sides of the coil 39, and magnets 40a and 40b are provided on their respective sides of the coil 41. As a current flows into the coils 39 and 41, the magnets 38a and 38b and the magnets 40a and 40b apply a force on the coil 39 and the coil 41, respectively, thus moving the substrate 33 in the direction of an arrow 18, namely, in the track direction of the magneto-optical recording medium 10. The travel thereof is conveyed to the magnetic element 31 via the arm 32, thus moving the magnetic element 31 in the track direction of the magneto-optical recording medium 10.

Thus, by controlling the amount and direction of the current flowing to the coils 36, 37, 39 and 41, the distance between the magnetic element 31 and the magneto-optical recording medium 10 is maintained constant and at the same time, the position of the magnetic element 31 can be controlled freely in both the radial direction and the track direction of the magneto-optical recording medium 10. Preferably, when a signal is to be recorded, a center position, which serves as a reference for the positioning of the magnetic element 31, is determined in advance and the magnetic element 31 is positioned according to this center position.

Figure 3:
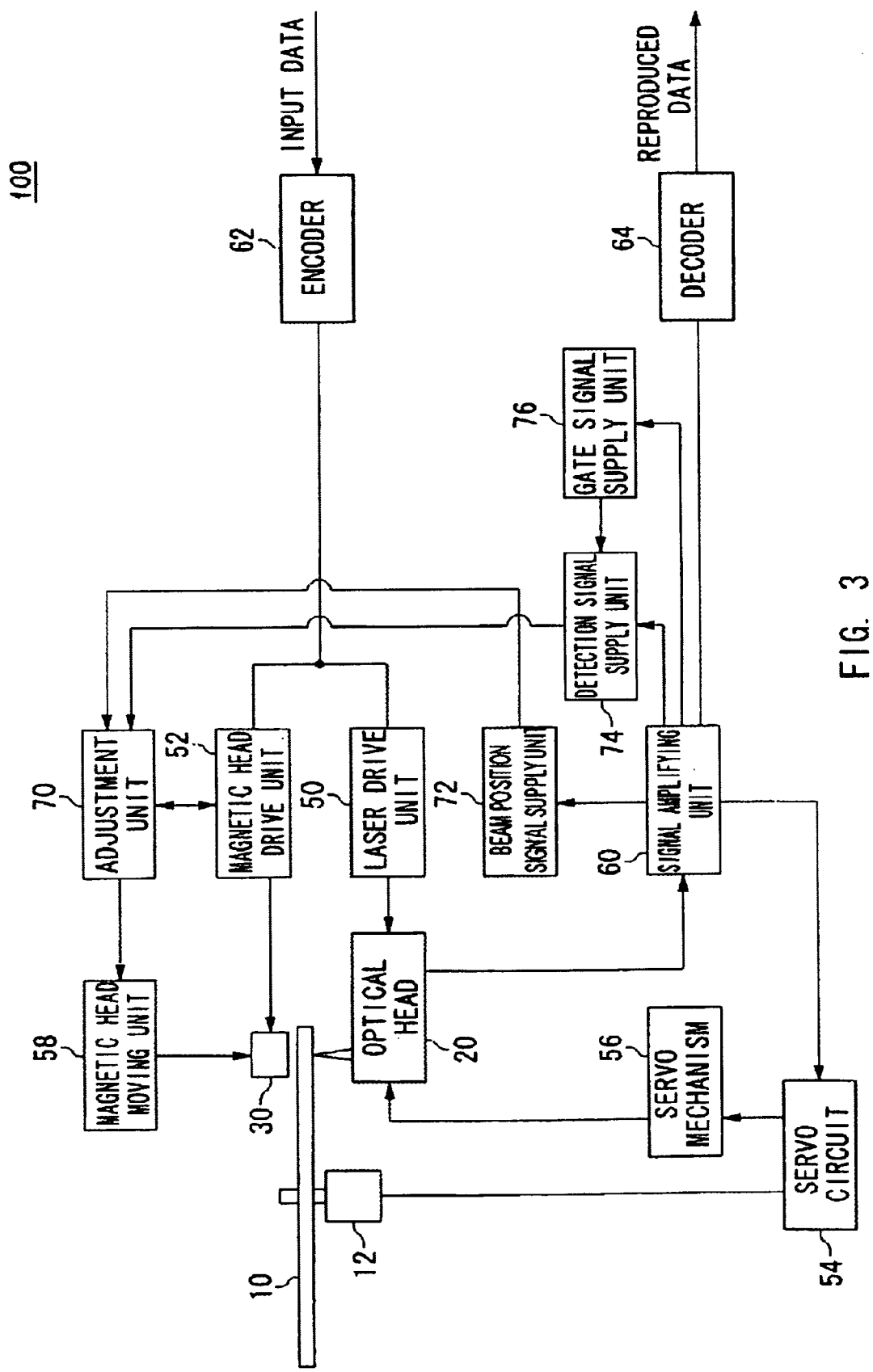
FIG. 3 shows a structure of a magneto-optical disk apparatus according to an embodiment of the present invention.

FIG. 3 shows a structure of a magneto-optical disk apparatus 100 according to a preferred embodiment of the present invention. The magneto-optical disk apparatus 100 records signals in the magneto-optical recording medium 10, using magnetic field and laser beam. The magneto-optical disk apparatus 100 has a function of positioning the magnetic element 31 relative to an accurate center position which is determined by adjusting the position of the magnetic head 30 prior to the start of the recording operation. In this embodiment, it is preferable that the magneto-optical recording medium 10 includes a recording layer where signals are recorded and a reproduction layer where signals from the recording layer are transcribed at the time of reproduction, and it is especially preferable that the magneto-optical recording medium 10 is of a static coupling type wherein an intermediate layer is provided between the recording layer and the reproduction layer. Of these, it is further preferable that the magneto-optical recording medium 10 is an MSR (Magnetically induced Super Resolution) disk of a CAD (center aperture detection) type.

The magneto-optical disk apparatus 100 is comprised of a spindle motor 12, an optical head 20, a magnetic head 30, a laser drive unit 50, a magnetic head drive unit 52, a servo circuit 54, a servo mechanism 56, a magnetic head moving unit 58, a signal amplifying unit 60, an encoder 62, a decoder 64, an adjustment unit 70, a beam position signal supply unit 72, a detection signal supply unit 74, and a gate signal supply unit 76.

The magnetic head 30 has a function of generating a magnetic field to the magneto-optical recording medium 10. Normally, the magnetic head 30 generates a magnetic field for recording when recording a signal, but, in this embodiment, the magnetic head 30 also generates a magnetic field for detection when adjusting the position of the magnetic head 30. The magnetic field for detection is weaker in strength than the magnetic field for recording. The optical head 20 has a function of irradiating a laser beam to the magneto-optical recording medium 10 and detecting light reflected therefrom. The optical head 20 irradiates the laser beam at a level of a reproduction output at the position adjustment of the magnetic head 30. The optical head 20 includes a semiconductor lens for emitting a laser beam, an objective lens for condensing the laser beam, and a photodetector for detecting reflected light. The optical head 20 further includes an actuator by which to control the objective lens. The actuator is structured by magnets and other components. The magnetic field is applied from a recording layer side whereas the laser beam is applied from a reproduction layer side. The magnetic head drive unit 52 drives the magnetic head 30 in such a manner that a predetermined magnetic field is generated from the magnetic element 31 (see FIG. 1) in the magnetic head 30. The laser drive unit 50 drives the semiconductor laser of the optical head 20.

The signal amplifying unit 60 receives tracking error signals, focus error signals, reflection signals and so forth detected by the photodetector of the optical head 20 and, after amplifying these signals to predetermined values, supplies the tracking error signals to the servo circuit 54 and the beam position signal supply unit 72, supplies the focus error signals to the servo circuit 54, and supplies the reflection signals to the decoder 64, the detection signal supply unit 74 and the gate signal supply unit 76. Here, the signal amplifying unit 60 may supply the reflection signals according to a mode of the magneto-optical disk apparatus 100. That is, in a signal reproduction mode, the signal amplifying unit 60 may supply the reflection signals to the decoder 64, while, in a position adjustment mode of the magnetic head 30, the signal amplifying unit 60 may supply reflection signals to the detection signal supply unit 74 and the gate signal supply unit 76. The servo circuit 54 controls the servo mechanism 56 based on the tracking error signal and focus error signal from the signal amplifying unit 60, and the servo mechanism 56 carries out the tracking servo and focus servo for the objective lens of the optical head 20.

Moreover, the servo circuit 54 rotates the spindle motor 12 at a predetermined rotational speed, and the spindle motor 12 rotates the magneto-optical recording medium 10 at the predetermined rotational speed. For signal reproduction, the decoder 64 demodulates reflected signals and outputs the thus demodulated signals as reproduced data. For signal recording, the encoder 62 encodes input data and supplies the input data to the magnetic head drive unit 52 when the signal recording is done by a magnetic field modulation method, or to the laser drive unit 50 when the signal recording is done by an optical modulation method.

The beam position signal supply unit 72 generates a beam position signal that indicates a position on the magneto-optical recording medium 10 to which the laser beam is irradiated, from the tracking error signal. This beam position signal has a waveform that changes the amplitude in vertical directions with respect to a certain linear axis, according to the amount of eccentricity of the magneto-optical recording medium 10. For example, a maximum value of the amplitude corresponds to the amount of eccentricity where, due to the eccentricity of the magneto-optical recording medium 10, the laser beam is deviated the farthest outward in the radial direction, whereas a minimum value of the amplitude corresponds to the amount of eccentricity where the laser beam is deviated the farthest inward in the radial direction. The beam position signal supply unit 72 supplies this beam position signal to the adjustment unit 70.

The detection signal supply unit 74 generates or acquires a detection signal from the reflected signal. This detection signal is generated or acquired for the position adjustment of the magnetic head 30 when the magnetic field is being applied to the magneto-optical recording medium 10. This detection signal normally corresponds to the reproduced signal. In the present embodiment, however, this signal is utilized not for reproduction but for the position adjustment of the magnetic head 30. In this patent specifications, therefore, the reproduced signal to be generated for the position adjustment of the magnetic head 30 is referred to as the detection signal, and the reproduced signal to be generated for signal reproduction is referred to as the reproduced signal per se. The detection signal supply unit 74 supplies detection signals to the adjustment unit 70.

The gate signal supply unit 76 detects a timing for generating a detection signal from a reflected signal and supplies a gate signal to the detection signal supply unit 74. For the detection signal supply unit 74, the timing to generate the detection signal is assigned by this gate signal.

The adjustment unit 70 has a function of detecting position deviation of the magnetic head 30 and adjusting the position thereof, based on a beam position signal supplied from the beam position signal supply unit 72, a detection signal supplied from the detection signal supply unit 74 and so forth. This position adjustment is carried out before the recording of signals. The essence of this position adjustment function lies in the use of the deviation of an irradiated laser beam spot due to the eccentricity of the magneto-optical recording medium 10. Since the laser beam can respond to the eccentricity of the magneto-optical recording medium 10 in real time based on the tracking error signal, and the adjustment unit 70 determines the center position of the magnetic head 30 using this feature. This center position corresponds to the center of travel of laser beam in the radial direction of the magneto-optical recording medium 10 due to the eccentricity thereof.

In more concrete terms, the adjustment unit 70 moves the magnetic head 30 little by little by driving the magnetic head moving unit 58 and searches for the center position of the magnetic head 30 using detection signals obtained at every move. When the center position is found, the position is set as the reference for positioning. When the core of the magnetic head 30 is larger than the amount of eccentricity, the magnetic head 30 may be fixed at the center position for subsequent recording. When the core is smaller than the amount of eccentricity, however, the magnetic head moving unit 58 moves the magnetic head 30 in a tracking manner so that the optical axis of laser beam coincides with the center of the generated magnetic field, thus carrying out recording on the magneto-optical recording medium 10 with the optical head 20. Since this arrangement ensures recording action with the position of the magnetic head accurately aligned to the optical axis of laser beam, it is possible to relax the conditions, such as upper limits and so forth, for the eccentricity of disks in manufacture.

Figure 4:
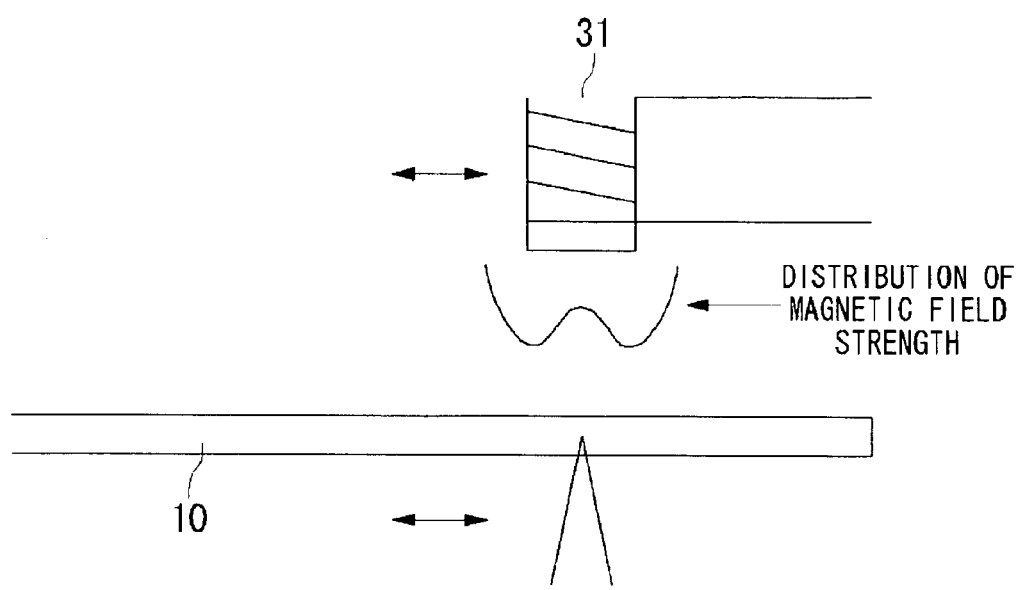
FIG. 4 shows a distribution of magnetic field generated by a magnetic element, and a laser beam.

FIG. 4 shows a distribution of magnetic field strength generated by a magnetic element 31, and a laser beam. As illustrated in FIG. 4, the distribution of magnetic field strength indicates that the magnetic field has different strengths between the center and the periphery or edges of the core, showing stronger magnetic field at the periphery or edges and a weaker magnetic field at the center. According to the present embodiment, the position adjustment of the magnetic head 30 is carried out by making use of this distribution of magnetic field strength displayed by the core. In this example, the illustration shows a state where the magnetic head 30 is located at the center position. With the magnetic head 30 disposed at the center position relative to the laser beam, a stable signal recording can be accomplished and the recording capacity of the magneto-optical recording medium 10 may be increased by downsizing the magnetic head core.

Figure 5:
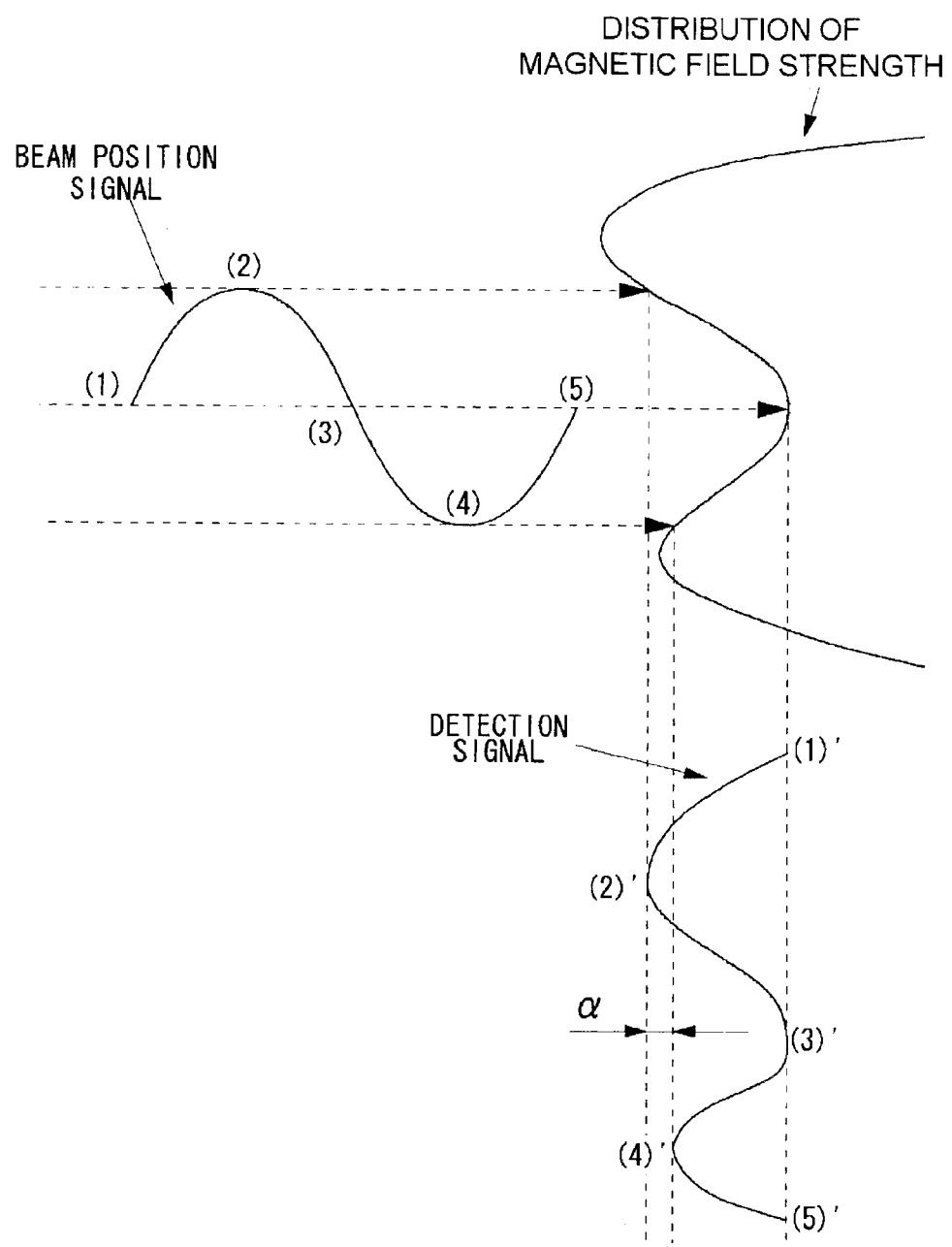
FIG. 5 shows a relationship between a beam position signal indicating an irradiation spot of the laser beam on the magneto-optical recording medium and a detection signal detected after modulation by a magnetic field supplied by the magnetic head.

FIG. 5 shows a relationship between a beam position signal indicating an irradiation spot of the laser beam on the magneto-optical recording medium and a detection signal detected after modulation by a magnetic field supplied by the magnetic head. In other words, the laser beam, which traverses within the range of magnetic field, is always subject to the influence of the magnetic field. FIG. 5 shows a relationship wherein the size of the core in a magnetic head is larger than the amount of eccentricity of a magneto-optical recording medium. This beam position signal represents the displacement (from (1) to (5)) for one rotation of a magneto-optical recording medium in a time series. For example, at point (2), the laser beam is irradiating an outermost position, whereas at point (4), the laser beam is irradiating an innermost position due to the eccentricity of the magneto-optical recording medium. At this time, the magnetic head is not located at the center position, so that the distribution of magnetic field strength is asymmetrical. The laser beam is modulated by this asymmetrical magnetic field and a detection signal as shown in FIG. 5 is generated. Of the detection signal, (1)' corresponds to (1) of the beam position signal, and likewise (2)', (3)', (4)' and (5)' correspond to (2), (3), (4) and (5) of the beam position signal, respectively.

As another example, when the distribution of magnetic field strength is symmetrical, namely, when the magnetic head is located at the center position, the detection signal will have a waveform substantially identical to that of the beam position signal. Hence, a technique for determining the center position of the magnetic head utilizing this relationship between the beam position signal and the detection signal will be described hereinbelow.

Figure 6:
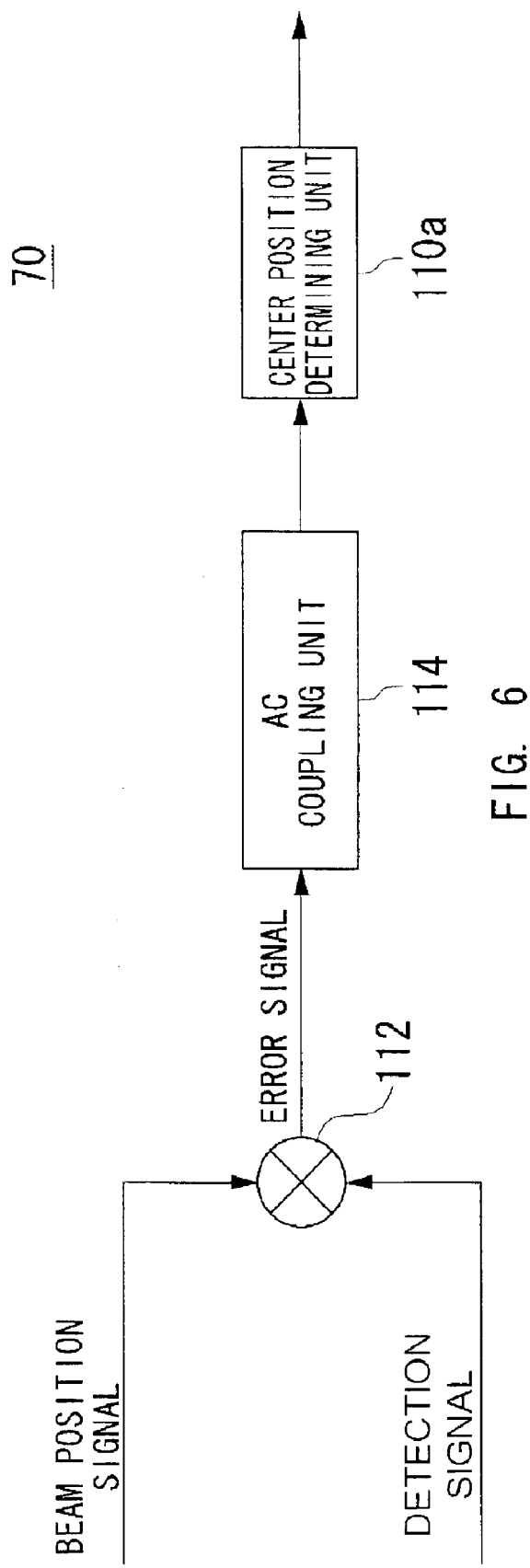
FIG. 6 shows one example of the structure of an adjustment unit.

FIG. 6 shows one example of the structure of an adjustment unit 70. The adjustment unit 70 is comprised of a multiplication unit 112, an AC coupling unit 114 and a center position determining unit 110*a*. First, the multiplication unit 112 multiplies a beam position signal by a detection signal, and outputs an error signal. Then the AC coupling unit 114 performs an AC coupling of this error signal. This processing is carried out, using the beam position signals for at least one rotation of the magneto-optical recording medium and the detection signals modulated by the magnetic field generated with the magnetic head fixed. And using this as a unit, the process is repeated a plurality of times by moving the magnetic head in the radial direction of the magneto-optical recording medium. The center position determining unit 110*a* detects signals when the timing at which positive and negative signs of a beam position signal are switched coincides with the timing at which positive and negative signs of a waveform after AC coupling are switched, and determines the position of the magnetic head then to be the center position. This center position is sent to the magnetic head moving unit 58 (see FIG. 3) so as to be used as the reference in aligning the magnetic head.

Figure 7:
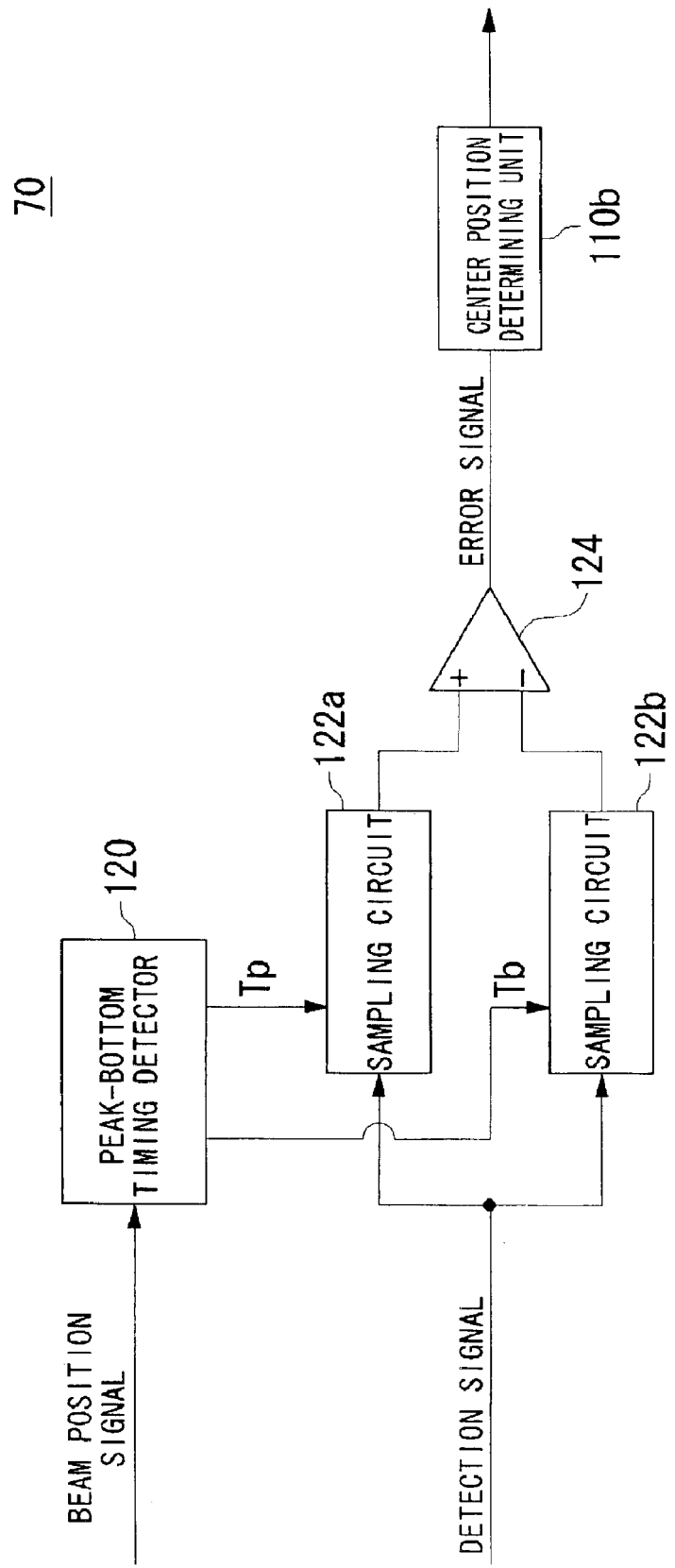
FIG. 7 shows another example of the structure of the adjustment unit.

FIG. 7 shows another example of the structure of the adjustment unit 70. This adjustment unit 70 is comprised of a peak-bottom timing detector 120, sampling circuits 122*a* and 122*b*, a difference detector 124 and a center position determining unit 110*b*. First, the peak-bottom timing detector 120 detects the timings when the beam position signal shows a peak value and a bottom value. Let the timing for the peak value be denoted by Tp and the timing for the bottom value be denoted by Tb. Referring to FIG. 5, the peak value timing Tp is point (2) and the bottom value timing Tb is point (4).

The sampling circuit 122*a* samples the detection signal at timing Tp, whereas the sampling circuit 122*b* samples the detection signal at timing Tb. The difference detector 124 detects a difference between these sampled values, and outputs an error signal to the center position determining unit 110b. The center position determining unit 110b determines the position of the magnetic head as the center position when the sampled amplitude values are substantially equal, that is, when the error signal is 0 or of a value close to 0. In the case of FIG. 5, the difference between the amplitude of detection signal (2)' at timing Tp and the amplitude of detection signal (4)' at timing Tb is given by a value α. This represents a case where there is a deviation in the center position of the magnetic head. On the other hand, when the distribution of magnetic field strength relative to a laser position signal is symmetrical, the detection signal becomes also symmetrical, so that the difference between the amplitude of detection signal (2)' and the amplitude of detection signal (4)' will be 0. Thus, the position of the magnetic head at this time is determined to be the center position.

Figure 8:
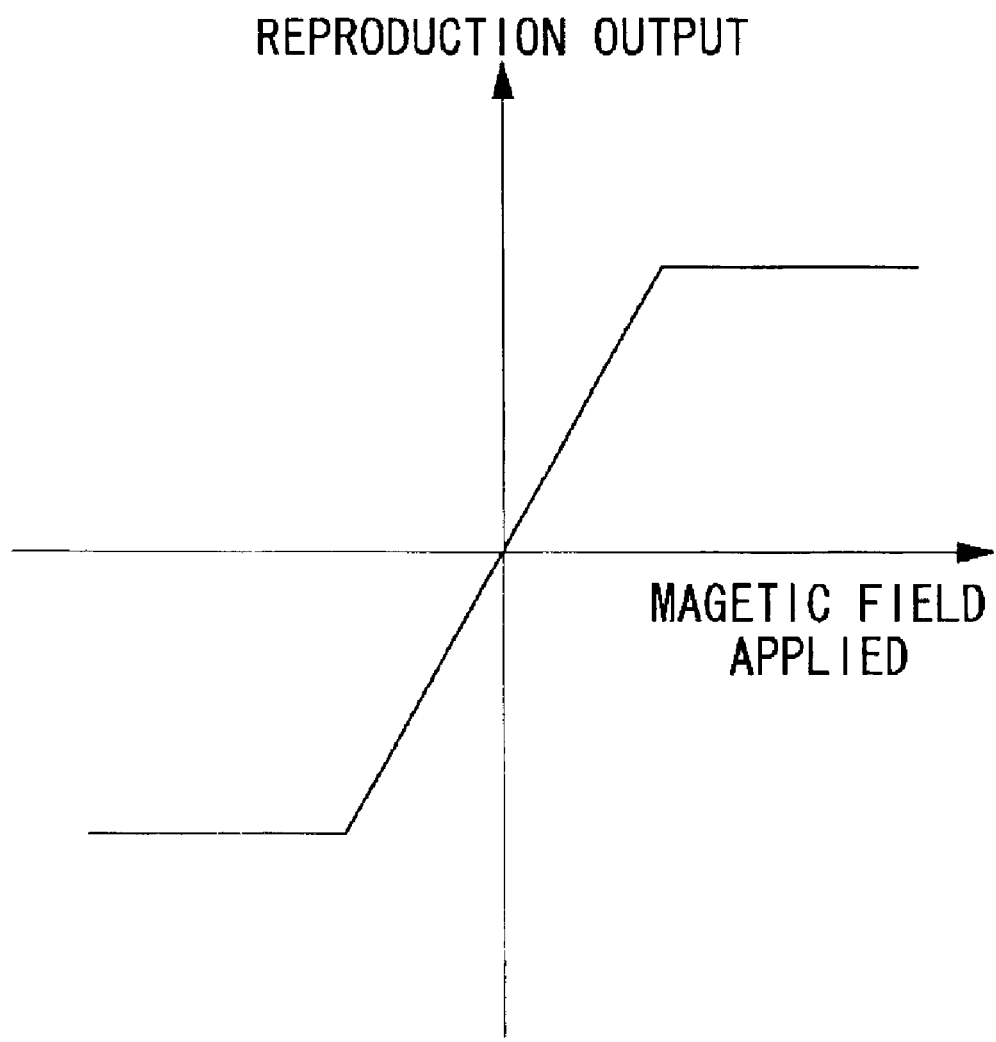
FIG. 8 shows a characteristic curve representing the relationship between the strength of magnetic field applied to a magneto-optical recording medium having a recording layer and a reproduction layer and a detection output at that time.

FIG. 8 shows a characteristic curve representing the relationship between the strength of magnetic field applied to a magneto-optical recording medium having a recording layer and a reproduction layer and the detection output at that time. At the position adjustment of the magnetic head, this reproduction output is equal to the amplitude of the detection signal. It is to be noted that, in particular, the magneto-optical recording medium of a static coupling type having an intermediate layer between the recording layer and the reproduction layer tends to show a higher output sensitivity to the applied magnetic field.

Figure 9:
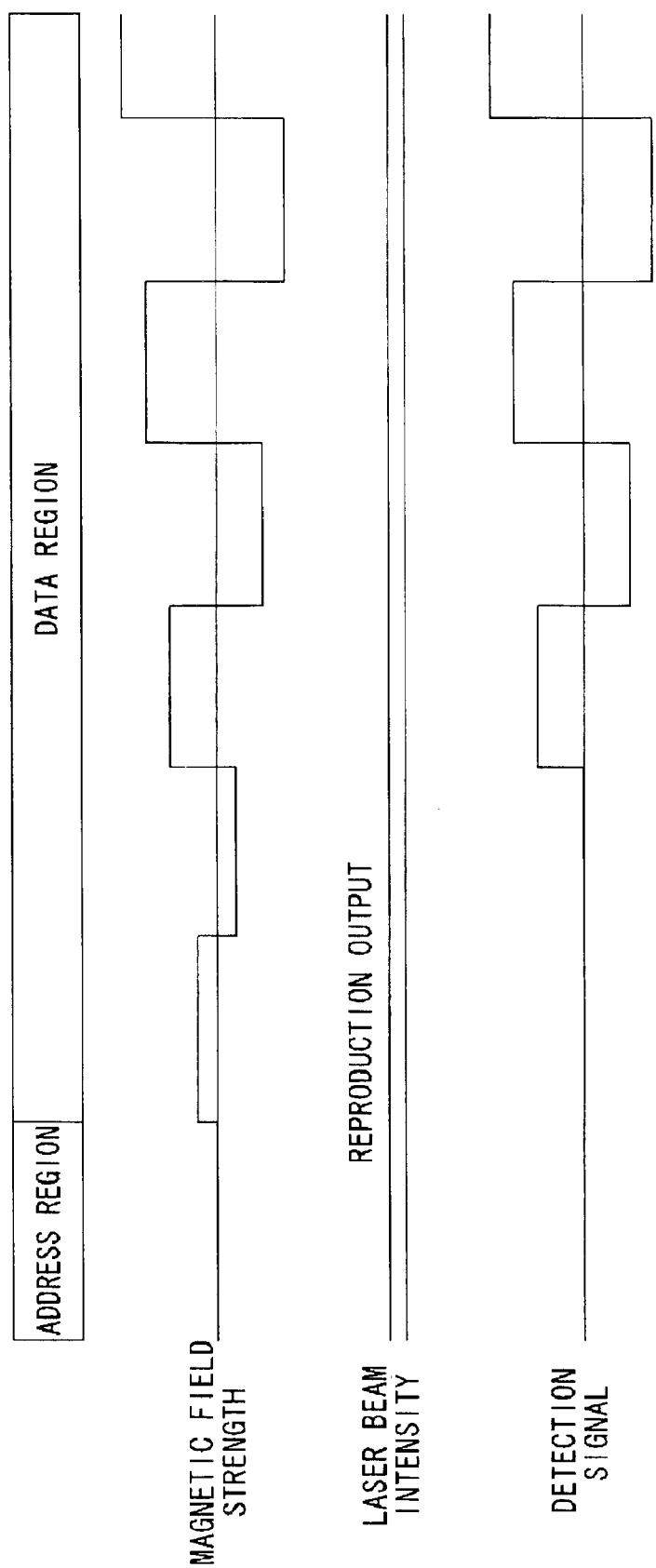
FIG. 9 is a timing chart to explain a method of position adjustment of a magnetic head using an amplitude of detection signal.

FIG. 9 is a timing chart to explain a method of position adjustment of a magnetic head using the amplitude of the detection signal. The laser beam is irradiated at the reproduction output. If the strength amplitude of magnetic field is gradually increased, the amplitude of the detection signal will become larger according to the characteristic curve of the magnetic field strength and the reproduction output as shown in FIG. 8. Since the output level of laser beam is held below the recording output level at signal recording, the beam irradiating spot on the magneto-optical recording medium is not heated above the Curie temperature. Therefore, there are no limitations on the positions where the magnetic field can be applied, so that even if both the laser beam and magnetic field are applied to a data region, recorded data will not be erased.

Figure 10A:
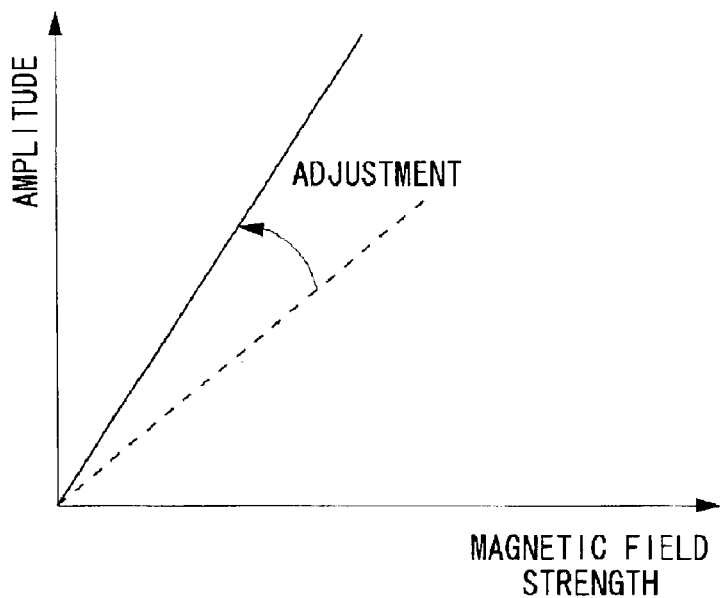
FIG. 10A is a graph showing a relationship between the strength of magnetic field applied on a magneto-optical recording medium and an amplitude of a detection signal.

FIG. 10A is a graph showing a relationship between the strength of magnetic field applied on a magneto-optical recording medium and the amplitude of a detection signal. The solid line represents the relationship between the magnetic field strength and the amplitude of detection signal when the magnetic head is located at the center position, and this relationship is called "applied magnetic field strength—signal amplitude characteristics." The applied magnetic field strength—signal amplitude characteristics are obtained beforehand by experiment.

In contrast, the relationship between the applied magnetic field strength and the amplitude of detection signal as shown in FIG. 9 is represented by a dotted line. In this case, when compared with the applied magnetic field strength—signal amplitude characteristics, the amplitude of the detection signal is lower in relation to the applied magnetic field, so that it is detected that the magnetic head is not located at the center position. Hence, in this case, the center position is sought by moving the position of the magnetic head in such a manner that the dotted line may coincide with the solid line.

Figure 10B:
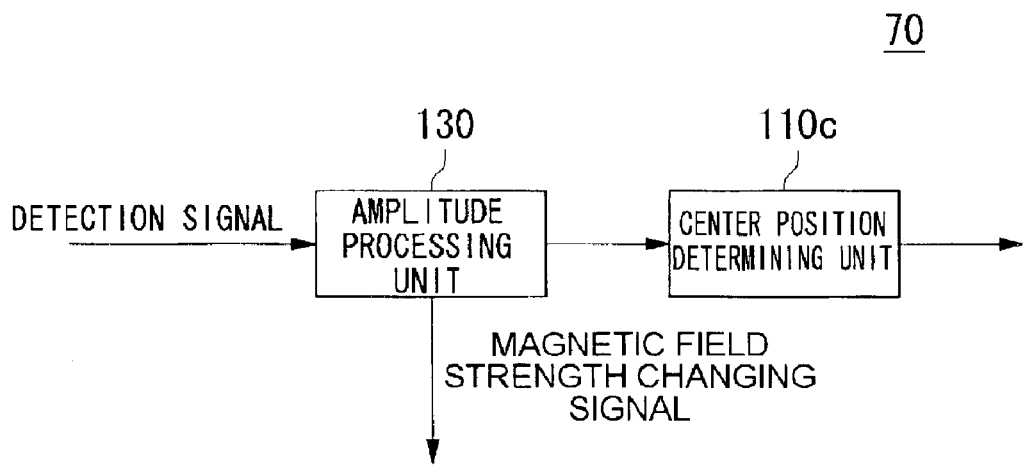
FIG. 10B shows still another example of the structure of the adjustment unit.

FIG. 10B shows still another example of the structure of the adjustment unit 70. The adjustment unit 70 includes an amplitude processing unit 130 and a center position determining unit 110c. The amplitude processing unit 130 detects the amplitude of detection signal and supplies the detected amplitude to the center position determining unit 110c. The center position determining unit 110c receives a magnetic field strength at the time from, for instance, the magnetic head drive unit 52 (see FIG. 3) and performs a detection as to whether or not the magnetic head is located at the center position, by referring to the characteristics shown in FIG. 10A. The amplitude processing unit 130 may make a request to the magnetic head drive unit 52 to change the magnetic field strength. If the magnetic field strength is changed, the amplitude processing unit 130 detects the amplitude of the changed detection signal and supplies this detected amplitude to the center position determining unit 110c.

The center position determining unit 110c can adjust the position of the magnetic head using the amplitude of a single detection signal, but it is preferable that the center position determining unit 110c determines the center position accurately by averaging the amplitudes of a plurality of detection signals. The center position determining unit 110c can determine the center position of the magnetic head, based on the amplitudes of the detection signals for magnetic fields of different strengths.

Figure 11:
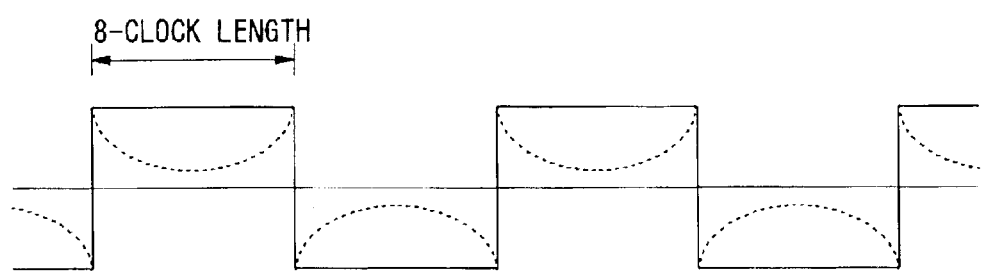
FIG. 11 shows an example of a detection signal which is generated from the light reflected from a mark to which a laser beam is irradiated.

FIG. 11 shows an example of a detection signal which is generated from the light reflected from a mark to which a laser beam is irradiated. The mark to be irradiated has a length equal to a plurality of clock lengths, or preferably a length equal to eight clock lengths or more. This mark may be recorded, in advance, on the magneto-optical recording medium as a mark for use with the position adjustment of the magnetic head, and moreover a mark for use with a synchronous signal of eight clock lengths in data may also be used.

The rectangular waves shown in a solid line in FIG. 11 are the waveform for the reproduction signal at signal reproduction. On the other hand, at the position adjustment of the magnetic head, a detection magnetic field weaker than a recording magnetic field is generated onto the magneto-optical recording medium, and the reflected light of the laser beam is detected. As a result, under the influence of external magnetic fields applied, the rectangular waves will be modulated in such a way as to have a distorted waveform such that the middle part is crushed as shown by the dotted line. This is attributed to the fact that the recorded signal has eight clock lengths, which is rather long, and the static coupling force near the center of the signal is weak.

Figure 12:
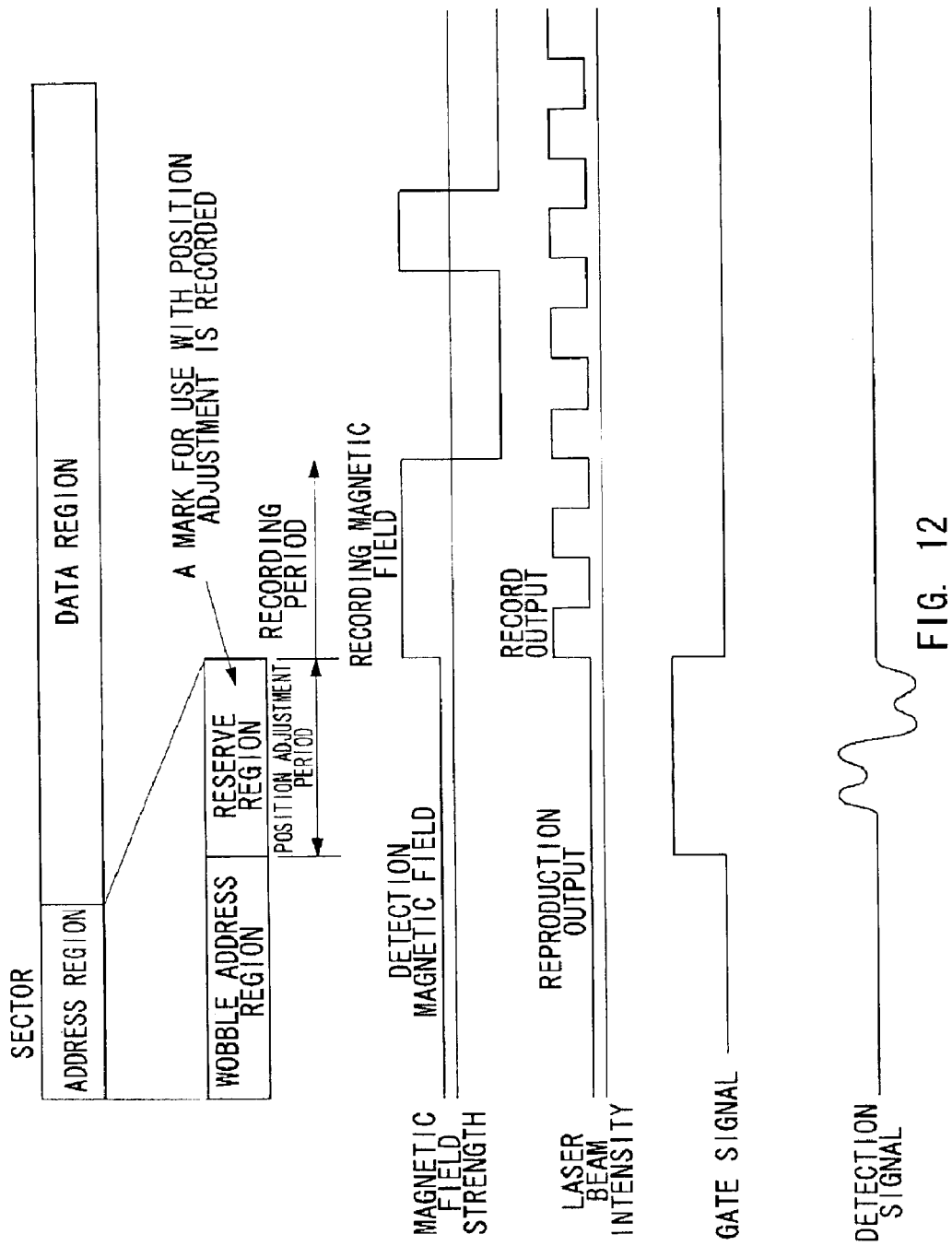
FIG. 12 is a timing chart to explain a method of position adjustment of a magnetic head using the detection signal.

FIG. 12 is a timing chart to explain a method of position adjustment of the magnetic head using the detection signal. This example shows a relationship where the size of the core in the magnetic head is larger than the amount of eccentricity of the magneto-optical recording medium. A wobble address region and a reserve region are provided in the address region of a sector, and a mark for use with position adjustment of a plurality of clock lengths is recorded in the reserve region.

For the duration of position adjustment of a magnetic head, the magnetic field is maintained at a detection magnetic field strength, and the laser beam is maintained at a reproduction output intensity. Referring back to FIG. 3, the detection signal supply unit 74 generates or acquires a detection signal during a high period only, based on the gate signal supplied form the gate signal supply unit 76. The gate signal supply unit 76 generates this gate signal by detecting the address region in a reflected signal. Because the size of the core is larger than the amount of eccentricity, the magnetic field is stronger in positions where the amount of eccentricity is large. Hence, as shown in FIG. 12, a detection signal influenced by the magnetic field are outputted during the position adjustment period, and the waveform as shown in FIG. 11 appears. Using this detection signal, the position of the magnetic head during the subsequent recording period is adjusted.

Figure 13A:
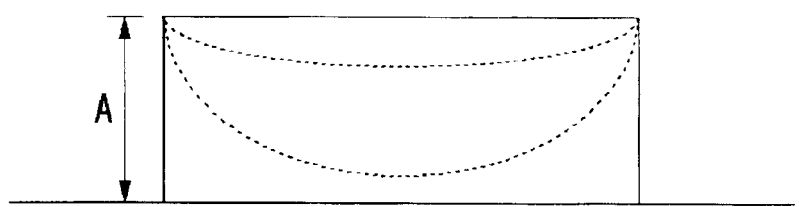
FIG. 13A shows a waveform of a detection signal which is modulated by an external magnetic field.

FIG. 13A shows a waveform of a detection signal which is modulated by an external magnetic field. The amplitude of a reproduction signal is A. During the position adjustment period, this amplitude is pushed downward by the external magnetic field. As described above, the magnetic field of the core is so distributed that it is weak in the center and strong in the periphery or edges. Therefore, when the magnetic head is located at the center position, a magnetic field is generated from the central part of the core, so that the distortion in the middle part of the waveform becomes small. On the other hand, when the magnetic head is located away from the center position, a magnetic field stronger than that of the center of the core is applied, so that the distortion in the middle part of the waveform becomes large.

Figure 13B:
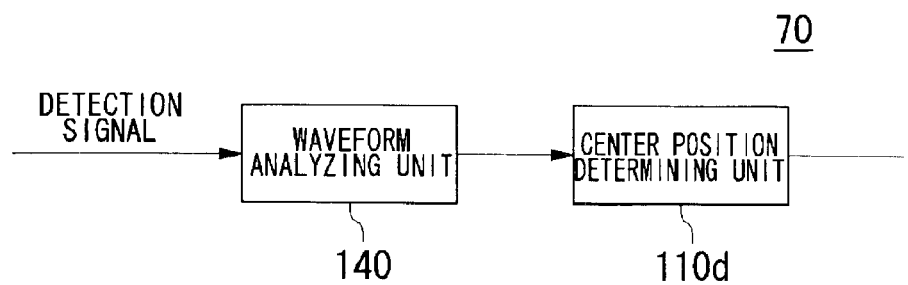
FIG. 13B shows still another example of the adjustment unit.

FIG. 13B shows still another example of the adjustment unit 70. The adjustment unit 70 includes a waveform analyzing unit 140 and a center position determining unit 110$d$. The waveform analyzing unit 140 detects the amplitude at an approximately central part of a mark area of the detection signal. This detected amplitude value is supplied to the center position determining unit 110$d$. The center position determining unit 110$d$ seeks out a detection signal that shows a maximum amplitude value, and determines the position of the magnetic head at the point when the detection signal is outputted, to be the center position.

Figure 14A:
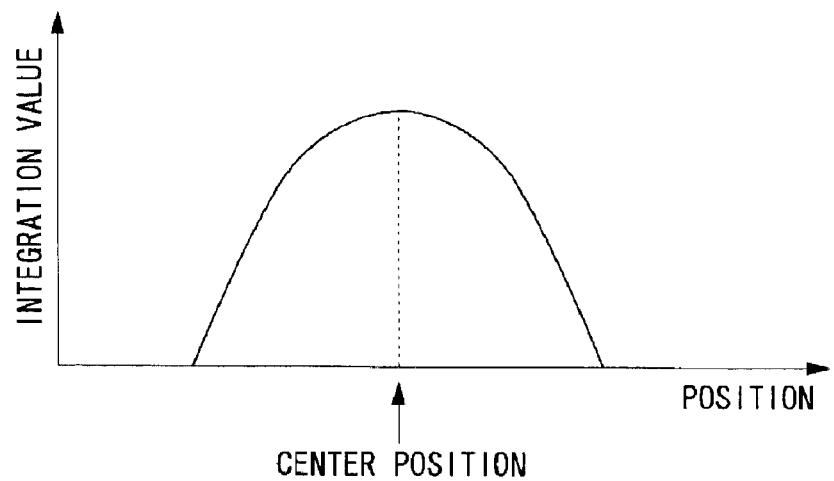
FIG. 14A shows integration values of the waveform shown in FIG. 13A.

FIG. 14A shows integration values of the waveform shown in FIG. 13A. Using the fact that the larger the distortion of a waveform the smaller the integration value of the waveform is, the waveform of the detection signal is integrated, and the position of the magnetic head showing a maximum value can be determined as the center position.

Figure 14B:
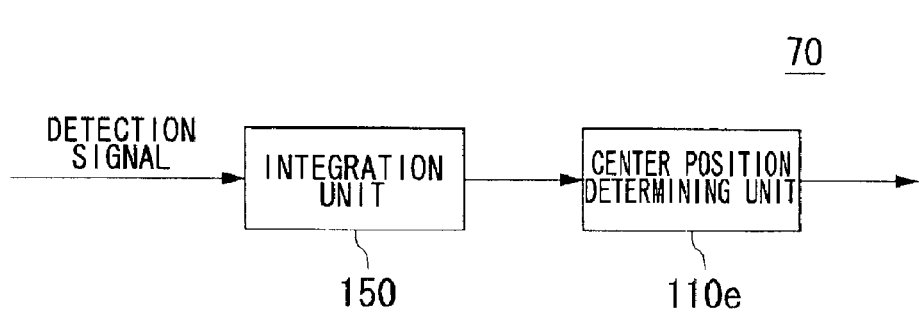
FIG. 14B shows still another example of the structure of the adjustment unit.

FIG. 14B shows still another example of the structure of the adjustment unit 70. This adjustment unit 70 includes an integration unit 150 and a center position determining unit 110$e$. The integration unit 150 calculates an integration value at the mark area of the detection signal, and the center position determining unit 110$e$ detects the maximum integration value and determines the center position of the magnetic head based on the detection result.

The present invention has been described based on embodiments which are only exemplary, but the technical scope of the present invention is not limited to the scope described in the embodiments. It is understood by those skilled in the art that there exist other various modifications to the combination of each component and process described above and that such modifications are encompassed by the scope of the present invention.

The description in the above embodiments was about instances where the position adjustment of the magnetic head 30 is performed with a magnetic field generated thereby, but this magnetic field may be generated by any of structures other than the magnetic head 30. For example, the optical head 20 has an actuator to control the objective lens, and the actuator contains magnets therein. Hence, the position adjustment of the magnetic head 30 may be performed, using the magnetic field leaking from the magnets in the actuator. This leakage magnetic field is concentrated in the ferrite part of the magnetic head 30, so that the detection signal can be acquired. It is to be noted here that the strength of the leakage magnetic field from the optical head 20 at the reproduction layer in the magneto-optical recording medium 10 is preferably higher than the coercive field strength of the reproduction layer and is further preferably larger than the holding power of the reproduction layer. Using this relationship, the amplitude of the detection signal can be made larger.

Although the present invention has been described by way of exemplary embodiments, it should be understood that many changes and substitutions may further be made by those skilled in the art without departing from the scope of the present invention which is defined by the appended claims.

What is claimed is:

1. A magneto-optical disk apparatus that records signals, utilizing a laser beam and a magnetic field, in a magneto-optical recording medium having a recording layer and a reproduction layer, the apparatus which generates the magnetic field onto the magneto-optical recording medium prior to recoding the signals and which adjusts a position of a magnetic head that generates the magnetic field, under a state where the laser beam is irradiated, by utilizing that an irradiation position of the laser beam deviates due to eccentricity of the magneto-optical recording medium.

2. A magneto-optical disk apparatus according to claim 1, wherein the magnetic field generated to adjust the position of the magnetic head is weaker than a recording magnetic field generated at the time of recording, and the intensity of the laser beam irradiated to adjust the position of the magnetic head is less than that generated at the time of recording.

3. A magneto-optical disk apparatus that records signals in a magneto-optical recording medium having a recording layer and a reproduction layer, the apparatus comprising:
a magnetic head which generates a magnetic field onto the magneto-optical recording medium;
an optical head which irradiates a laser beam to the magneto-optical recording medium and detects reflected light therefrom;
a supply unit which supplies a beam position signal that indicates an irradiation position of the laser beam in the magneto-optical recording medium; and
an adjustment unit which adjusts a position of said magnetic head, utilizing a detection signal generated based on the reflected light and the beam position signal.

4. A magneto-optical disk apparatus according to claim 3, wherein said adjustment unit determines a center position of said magnetic head, based on an error signal obtained by multiplying the beam position signal by the detection signal.

5. A magneto-optical disk apparatus according to claim 3, wherein said adjustment unit determines a center position of said magnetic head, based on a result in which the detection signal is sampled at timings when the beam position signal indicates a peak value and a bottom value.

6. A magneto-optical disk apparatus according to claim 5, wherein, if sampled amplitude values are substantially equal, said adjustment unit determines and regards the then corresponding position of said magnetic head as the center position.

7. A magneto-optical disk apparatus that records signals in a magneto-optical medium having a recording layer and reproduction layer, the apparatus comprising:
a magnetic head which generates a detection magnetic field which is lower than a recording magnetic field;
an optical head which irradiates a laser beam to the magneto-optical recording medium and detects reflected light therefrom; and an adjustment unit which adjusts a position of said magnetic head, utilizing a detection signal generated based on the reflected light.

8. A magneto-optical disk apparatus according to claim 7, wherein said optical head irradiates the laser beam to a mark area, having a plurality of clock lengths, which are recorded in the magneto-optical recording medium, and wherein said adjustment unit determines a center position of said magnetic head by making use of the detection signal generated based on the light reflected from the mark area.

9. A magneto-optical disk apparatus according to claim 8, wherein said adjustment unit determines the center position of said magnetic head by making use of an integration result of the detection signal in the mark area.

10. A magneto-optical disk apparatus according to claim 8, wherein said adjustment unit determines the center position of said magnetic head, based on an amplitude area of the detection signal corresponding to a substantially central portion of the mark.

11. A magneto-optical disk apparatus according to claim 8, wherein the mark area is recorded in a reserve region inside an address region.

12. A magneto-optical disk apparatus that records signals, utilizing a laser beam and a magnetic field, in a magneto-optical medium having at least a recording layer and a reproduction layer, the apparatus which adjusts a position of a magnetic head that generates the magnetic field, prior to recording the signals, by utilizing that an irradiation position of the laser beam deviates due to eccentricity of the magneto-optical medium under a state where there is a leakage of magnetic field from an optical head and the laser beam is irradiated.

13. A magneto-optical disk apparatus according to claim 12, wherein coercive force of the reproduction layer is less than strength of the magnetic field leaked from the optical head.

* * * * *